(12) United States Patent
Lee et al.

(10) Patent No.: US 11,917,501 B2
(45) Date of Patent: *Feb. 27, 2024

(54) TRANSMISSIONS OF UNICAST FRAMES TO CLIENT DEVICES

(71) Applicant: Hewlett Packard Enterprise Development LP, Houston, TX (US)

(72) Inventors: Jeongkeun Lee, Mountain View, CA (US); Souvik Sen, Mountain View, CA (US); Stephane Laroche, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,414

(22) Filed: Apr. 5, 2021

(65) Prior Publication Data
US 2022/0322047 A1 Oct. 6, 2022

Related U.S. Application Data

(63) Continuation of application No. 15/735,225, filed as application No. PCT/US2015/038011 on Jun. 26, 2015, now Pat. No. 10,972,300.

(51) Int. Cl.
*H04W 4/06* (2009.01)
*H04L 12/18* (2006.01)
(Continued)

(52) U.S. Cl.
CPC ......... *H04W 4/06* (2013.01); *H04W 28/0289* (2013.01); *H04L 12/185* (2013.01);
(Continued)

(58) Field of Classification Search
CPC . H04L 12/185; H04L 12/189; H04L 41/0896; H04L 43/16; H04L 12/1863;
(Continued)

(56) References Cited

U.S. PATENT DOCUMENTS

| 6,600,752 B1 | 7/2003 | Duong-Van |
| 7,505,447 B2 | 3/2009 | Kish et al. |

(Continued)

FOREIGN PATENT DOCUMENTS

| EP | 2161953 A2 | 3/2010 |
| EP | 2347534 A1 | 7/2011 |

(Continued)

OTHER PUBLICATIONS

Acharya et al., "MARS: Link-layer rate selection for multicast transmissions in wireless mesh networks", Ad Hoc Networks, vol. 9, Jan. 2011, pp. 48-60.

(Continued)

*Primary Examiner* — Khaled M Kassim
*Assistant Examiner* — Kai Chang
(74) *Attorney, Agent, or Firm* — Hewlett Packard Enterprise Patent Department

(57) ABSTRACT

An example system includes a transceiver. The transceiver communicates multicast frames to a plurality of client devices in a multicast group. The system further includes a controller. The controller determines that a predetermined time has passed since the transceiver most recently sent a unicast transmission to one of the plurality of client devices. The controller instructs the transceiver to transmit a unicast frame to the one of the plurality of client devices. The controller computes a data rate for the one of the plurality of client devices based on the transmission of the unicast frame to the one of the plurality of client devices.

20 Claims, 8 Drawing Sheets

(51) Int. Cl.
  *H04L 41/0896* (2022.01)
  *H04L 43/16* (2022.01)
  *H04W 28/02* (2009.01)
  *H04W 28/22* (2009.01)

(52) U.S. Cl.
  CPC ........ *H04L 12/189* (2013.01); *H04L 41/0896* (2013.01); *H04L 43/16* (2013.01); *H04W 28/22* (2013.01)

(58) Field of Classification Search
  CPC  H04L 41/0893; H04W 4/06; H04W 28/0289; H04W 28/22
  See application file for complete search history.

(56) References Cited

U.S. PATENT DOCUMENTS

| | | | |
|---|---|---|---|
| 8,295,219 | B2 | 10/2012 | Moon |
| 8,411,608 | B2 | 4/2013 | Chandra et al. |
| 8,660,051 | B2 | 2/2014 | Yamada |
| 8,976,722 | B2 * | 3/2015 | Song .................... H04W 72/005 370/312 |
| 8,989,074 | B2 | 3/2015 | Oikawa |
| 9,019,886 | B2 * | 4/2015 | Kish ........................ H04L 45/16 370/254 |
| 10,972,300 | B2 * | 4/2021 | Lee .......................... H04W 4/06 |
| 2002/0026482 | A1 * | 2/2002 | Morishige ............... H04W 4/02 340/7.29 |
| 2003/0135863 | A1 | 7/2003 | Van Der Schaar |
| 2003/0179720 | A1 | 9/2003 | Cuny |
| 2005/0207354 | A1 | 9/2005 | Nekovee et al. |
| 2006/0018335 | A1 | 1/2006 | Koch et al. |
| 2008/0002691 | A1 * | 1/2008 | Qi ....................... H04L 12/1868 370/390 |
| 2009/0247089 | A1 * | 10/2009 | Budde .................. H04W 52/34 455/69 |
| 2010/0135297 | A1 | 6/2010 | Brousard et al. |
| 2011/0032832 | A1 * | 2/2011 | Jalali ..................... H04W 28/02 370/312 |
| 2011/0158253 | A1 | 6/2011 | Dukkipati et al. |
| 2013/0279391 | A1 | 10/2013 | Gupta et al. |
| 2014/0071879 | A1 | 3/2014 | Kish et al. |
| 2015/0117235 | A1 | 4/2015 | Bhanage et al. |
| 2015/0381314 | A1 * | 12/2015 | Tomisawa ............. H04L 1/0009 714/776 |
| 2016/0359755 | A1 * | 12/2016 | Li .......................... H04L 65/762 |
| 2017/0289990 | A1 * | 10/2017 | Kaushik .............. H04L 12/4625 |
| 2018/0183616 | A1 * | 6/2018 | Lee ..................... H04L 41/0896 |

FOREIGN PATENT DOCUMENTS

| | | | | |
|---|---|---|---|---|
| WO | | 2010/052553 A1 | 5/2010 | |
| WO | WO-2016192138 A1 * | 12/2016 | ............ H04W 28/22 |

OTHER PUBLICATIONS

Basalamah, A et al, "Rate Adaptive Reliable Multicast MAC Protocol for WLANs", May 7-10, 2006, 5 Pgs.
European Search Report and Search Opinion Received for EP Application No. 15896552.5, dated Oct. 12, 2018, 10 pages.
International Preliminary Report on Patentability received for PCT Patent Application No. PCT/US2015/038011, dated Jan. 4, 2018, 10 pages.
International Search Report and Written Opinion received for PCT Patent Application No. PCT/US2015/038011, dated Mar. 23, 2016, 11 pages.
Sen et al., "Scalable WiFi Media Delivery through Adaptive Broadcasts", Proceedings of the 7th USENIX Symposium on Networked Systems Design and Implementation, 2010, 14 pages.
Shin et al., "Empirical analysis of video multicast over WiFi", Third International Conference on Ubiquitous and Future Networks (ICUFN), 2011, 6 pages.

* cited by examiner

TRANSMISSIONS OF UNICAST FRAMES TO CLIENT DEVICES

CROSS REFERENCE TO RELATED APPLICATIONS

This application is a continuation of U.S. patent application Ser. No. 15/735,225, filed on Dec. 11, 2017, issued as U.S. Pat. No. 10,972,300, which is a 371 National Stage Entry of PCT/US2015/038011, filed on Jun. 26, 2015, the contents of which are incorporated herein by reference in their entirety.

BACKGROUND

A wireless access point (AP) may communicate with a plurality of client devices. The AP may be able to communicate at any of a variety of data rates. The AP may transmit unicast frames. As used herein, the term "unicast frame" refers to data that includes an address for a specific client device. The AP may also transmit multicast frames. As used herein, the term "multicast frame" refers to data that includes a multicast address identifying a multicast group. Any client devices belonging to the multicast group may detect the multicast address and process the corresponding frame.

DETAILED DESCRIPTION

Figure 1:
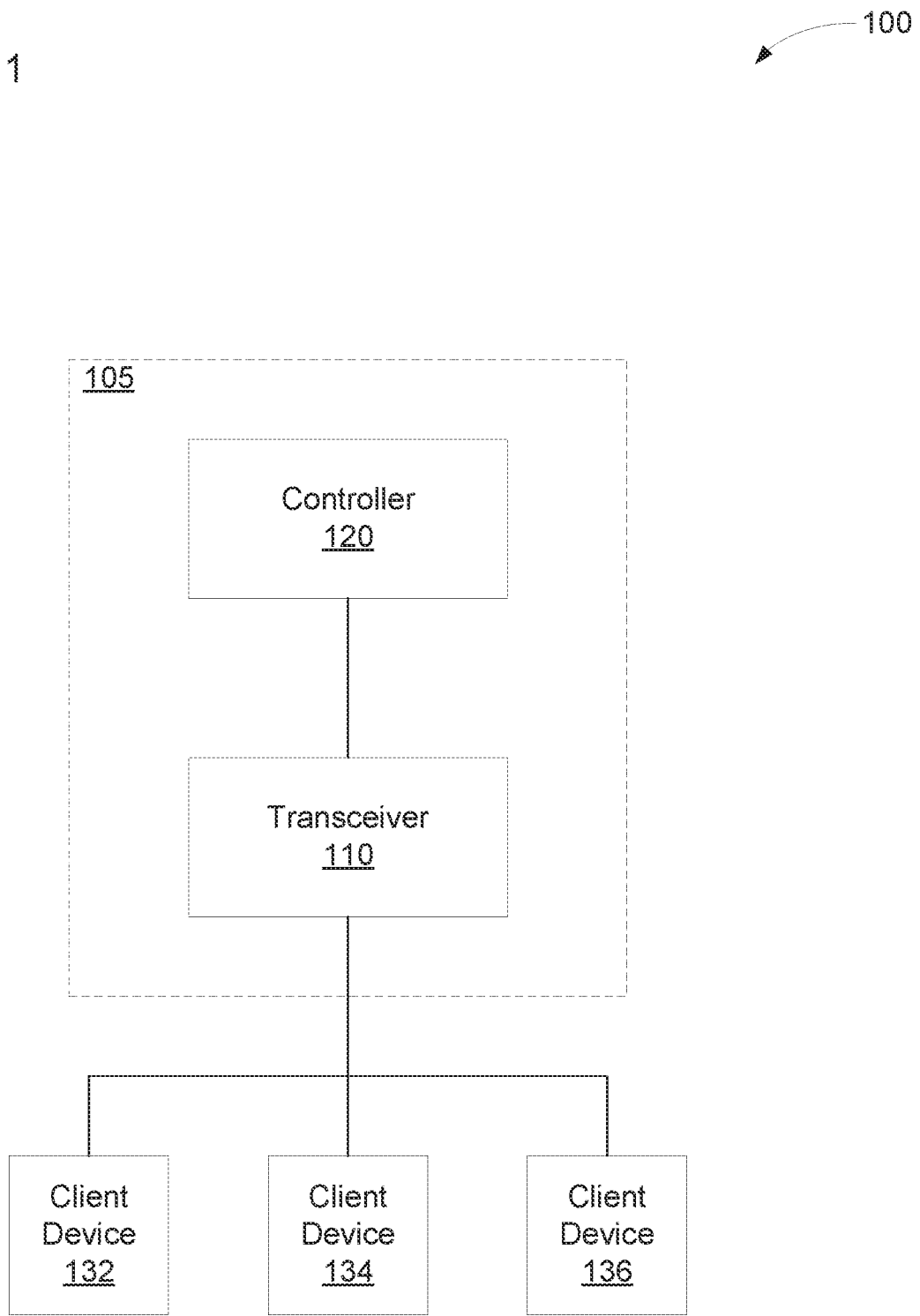
FIG. 1 is a block diagram of an example of an environment containing a system to determine a data rate for a client device in a multicast group.

An AP may adjust the data rate of unicast transmissions to a client device based on channel conditions. When the client device successfully receives a unicast frame, it may transmit an acknowledgement frame (ACK). The AP may determine the channel conditions based on whether it receives ACKs for frames transmitted to the client device. For example, the AP may maintain a packet error rate (PER) table that tracks whether frames at various data rates were transmitted successfully. Based on the PER table, the AP may use a rate selection calculation to determine which data rate should be used to communicate unicast frames to the client device.

The AP may transmit multicast frames to a plurality of client devices belonging to a multicast group. The plurality of client devices may not transmit ACKs when multicast frames are transmitted successfully. Accordingly, the AP is not able to determine channel conditions based on the success or failure of multicast transmissions. Various strategies may be used for selecting the data rate for transmitting multicast frames. In one example, a default rate is selected for transmitting multicast frames. The default rate may be a minimum possible data rate or just above the minimum possible data rate. The low data rate may ensure that all client devices capable of receiving transmissions can receive the multicast transmissions. However, the default rate fails to take advantage of higher data rates when all client devices can support the higher data rates, and the channel capacity quickly becomes saturated by even a single, small data stream (e.g., a low quality video stream may occupy most or all of the channel capacity when using a 2 or 6 Megabit per second (Mbps) data rate).

In another example, the AP transmits all multicast traffic using unicast frames for each client device in the multicast group. The AP may use a higher rate for each client device and may retransmit unacknowledged frames. However, as the number of client devices increases, the channel capacity becomes saturated even when communicating at higher data rates (e.g., high definition (HD) video may occupy most of, all of, or even exceed the channel capacity when being transmitted to an auditorium filled with students).

In still another example, the AP determines a unicast data rate for each client device based on unicast transmissions to each client device (e.g., whether the unicast transmissions were acknowledged). The multicast data rate can be determined based on the unicast data rates of the individual client devices. However, a rate selection calculation for determining a unicast data rate may decrease the unicast data rate if there have been no recent transmissions of unicast frames. For example, the rate selection calculation may age out old transmission information and gradually decrease the rate due to the lack of information. Often, a client device in the multicast group will not have sufficient unicast traffic to prevent its calculated unicast data rate from declining, thereby dragging down the multicast data rate for the entire group.

FIG. 1 is a block diagram of an example of an environment 100 containing a system 105 to determine a data rate for a client device 132 in a multicast group. The system 105 may include a transceiver 110 to communicate multicast frames to a plurality of client devices 132, 134, 136 in a multicast group. As used herein, the term "transceiver" refers to hardware (e.g., analog or digital circuitry) to modulate and demodulate electromagnetic waves. The transceiver may, but does not necessarily, include an antenna. In one example, the transceiver 110 communicates the multicast frames to the plurality of client devices 132, 134, 136 by transmitting a wireless signal that can be detected by any devices near the transceiver 110. A device near the transceiver may determine the intended recipient by reading a destination address in the transmitted frames and determining whether the transmitted frames are addressed to the device or to a multicast group to which the device belongs. In the illustrated example, the transceiver 110 communicates with three client devices, but in other examples, the transceiver 110 may communicate with tens, hundreds, or more client devices.

The system 105 may also include a controller 120 able to communicate with the transceiver 110. As used herein, the terms "controller" and "component" refer to a combination of hardware (e.g., a processor such as an integrated circuit or other circuitry) or software (e.g., programming such as machine- or processor-executable instructions, commands, or code such as firmware, programming, or object code). A combination of hardware or software includes hardware only (i.e., a hardware element with no software elements such as an application specific integrated circuit (ASIC)), software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. A controller or component may include multiple processors, such as a microprocessor and a field programmable gate array (FPGA), that each performs some operations of the controller or component.

The controller 120 may determine that a predetermined time has passed since the transceiver most recently sent a unicast transmission to a client device 132. For example, the predetermined time may correspond to the time for information to be aged out by a rate selection calculation. The controller 120 may measure the time since a last unicast transmission to the client device 132 to determine when the unicast transmission will be aged out by the rate selection calculation, so the rate selection calculation is not required to separately report when client devices will age out.

The controller 120 may instruct the transceiver 110 to transmit a unicast frame to the client device 132. The controller 120 may generate the unicast frame to be provided to the client device 132. In one example, the controller 120 may include a transmit queue containing data to be transmitted by the transceiver 110. The controller 120 may instruct the transceiver 110 to transmit the unicast frame by inserting the unicast frame into the transmit queue. The predetermined time since a most recent unicast transmission may be a predetermined time since the most recent controller generated unicast frame, since the most recent unicast frame not generated by the controller 120, since any unicast frame whether generated or not generated by the controller 120, or the like.

The controller 120 may compute a data rate for the client device 132 based on the transmission of the unicast frame to the client device 132. For example, the controller 120 may update a PER table with an indication of whether an ACK was received in response to the transmission. The rate selection calculation may determine the data rate for the client device based on the updated PER table.

Figure 2:
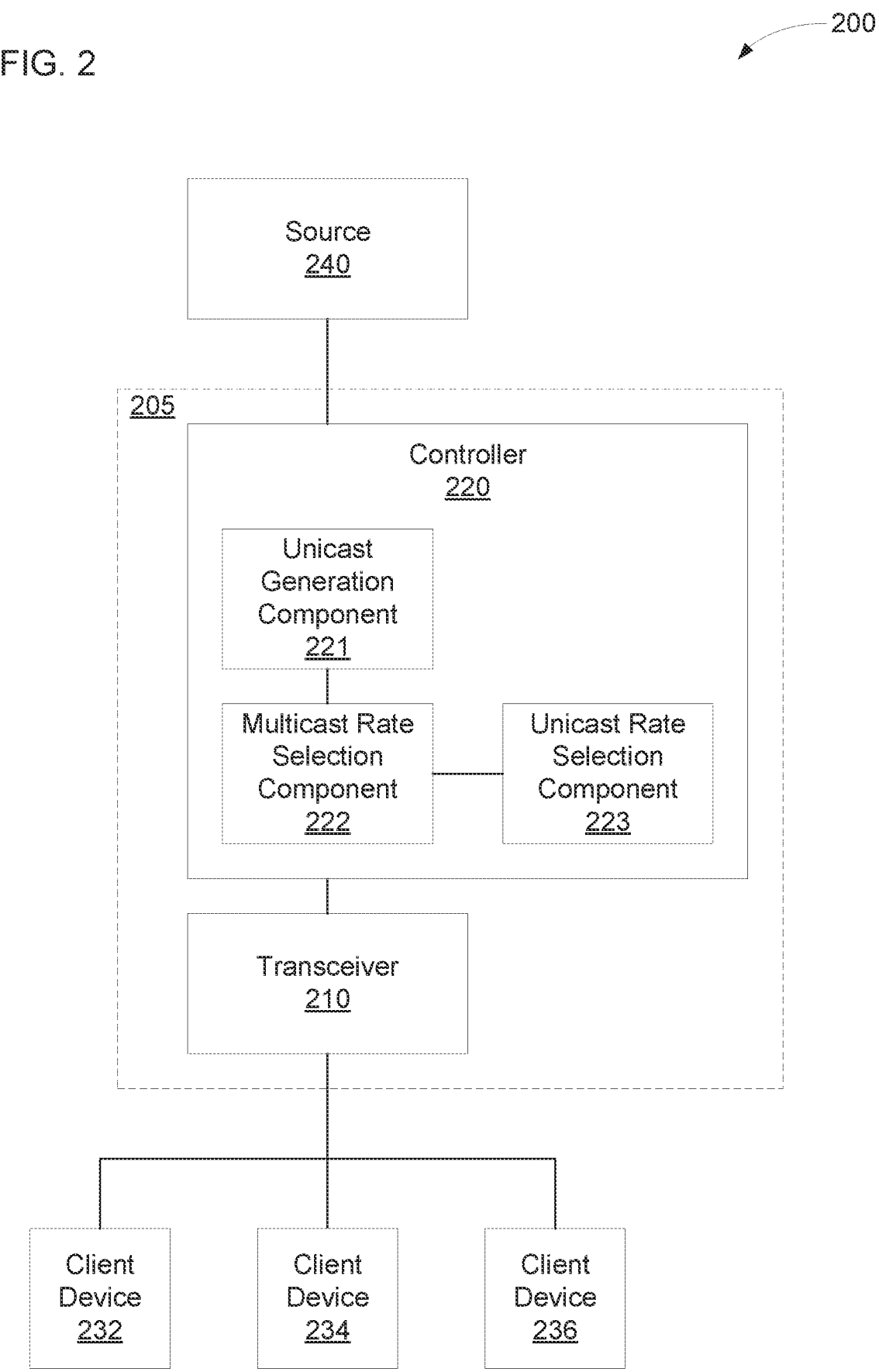
FIG. 2 is a block diagram of another example of an environment containing a system to determine a multicast data rate for client devices in a multicast group.

FIG. 2 is a block diagram of another example of an environment 200 containing a system 205 to determine a multicast data rate for client devices 232, 234, 236 in a multicast group. The system 205 may include a transceiver 210 to communicate with the plurality of client devices 232, 234, 236 in the multicast group. The system 205 may also include a controller 220 able to communicate with the transceiver 210.

The controller 220 may include a unicast generation component 221, a multicast rate selection component 222, and a unicast rate selection component 223. The multicast rate selection component 222 may determine that a predetermined time has passed since the transceiver 210 most recently sent a unicast transmission to a client device 232. The unicast generation component 221 may instruct the transceiver 221 to transmit a unicast frame to the client device 232. The unicast rate selection component 223 may compute a unicast data rate for the client device 232 based on the transmission of the unicast frame to the client device 232.

The multicast rate selection component 222 may also determine a data rate for multicast frames transmitted to the plurality of client devices 232, 234, 236. For example, the multicast rate selection component 222 may determine a lowest data rate among computed data rates of the plurality of client devices 232, 234, 236 in the multicast group. The multicast rate selection component 222 may receive the unicast data rate for each client device 232, 234, 236 and determine which of the received unicast data rates is the lowest. The multicast rate selection component 222 may instruct the transceiver 210 to transmit multicast frames to the plurality of client devices 232, 234, 236 at the lowest data rate.

The unicast generation component 221 may determine which client devices 232, 234, 236 are in the multicast group by snooping messages to join and leave the multicast group. The client device 232, 234, 236 may indicate to a source 240 of the multicast traffic whether they would like to join or leave the multicast group. The unicast generation component 221 may snoop the join and leave messages while the messages are in transit to the source 240 to detect which client devices 232, 234, 236 are in the multicast group. Alternatively, the unicast generation component 221 or multicast rate selection component 222 may receive an indication of the multicast group members from the source 240 or another component (e.g., another component snooping join and leave messages). The unicast generation component 221 may indicate the multicast group members to the multicast rate selection component 222. The multicast rate selection component 222 may determine for each member of the multicast group whether the predetermined time has passed since the sending of a most recent unicast transmission to that member.

The unicast generation component 221 may generate the unicast frames to be transmitted to the client devices 232, 234, 236 by the transceiver 210. In one example, the unicast generation component 221 may generate the unicast frame by including a payload of a multicast frame in the unicast frame. Alternatively, the unicast generation component 221 may generate a dummy unicast frame that includes an alternative payload, such as an empty payload, a predetermined payload, a payload that mimics expected multicast traffic, a random payload, or the like. Using a payload from a multicast frame or one similar to the payload from a multicast frame may provide a more accurate indication to a unicast rate selection component 223 of the channel conditions that will be experienced by multicast frames. The unicast generation component 221 may instruct the transceiver 210 to transmit the multicast frame as well as the unicast frame generated therefrom. Alternatively, the unicast generation component 221 may transmit unicast frames to every client device 232, 234, 236 without transmitting a multicast frame when a single client device 232 needs to receive a unicast frame.

In the illustrated example, the controller 220 includes a unicast rate selection component 223. The unicast rate selection component 223 may determine a data rate for each client device 232, 234, 236 that is used when communicating a unicast frame to that client device 232, 234, 236. For example, the unicast rate selection component 223 may include a PER table, a rate selection calculation, or the like to determine the data rates. In alternate examples, the controller 220 may not include the unicast rate selection component 223, which may instead be a unicast rate selection device separate from the controller 220.

Figure 3:
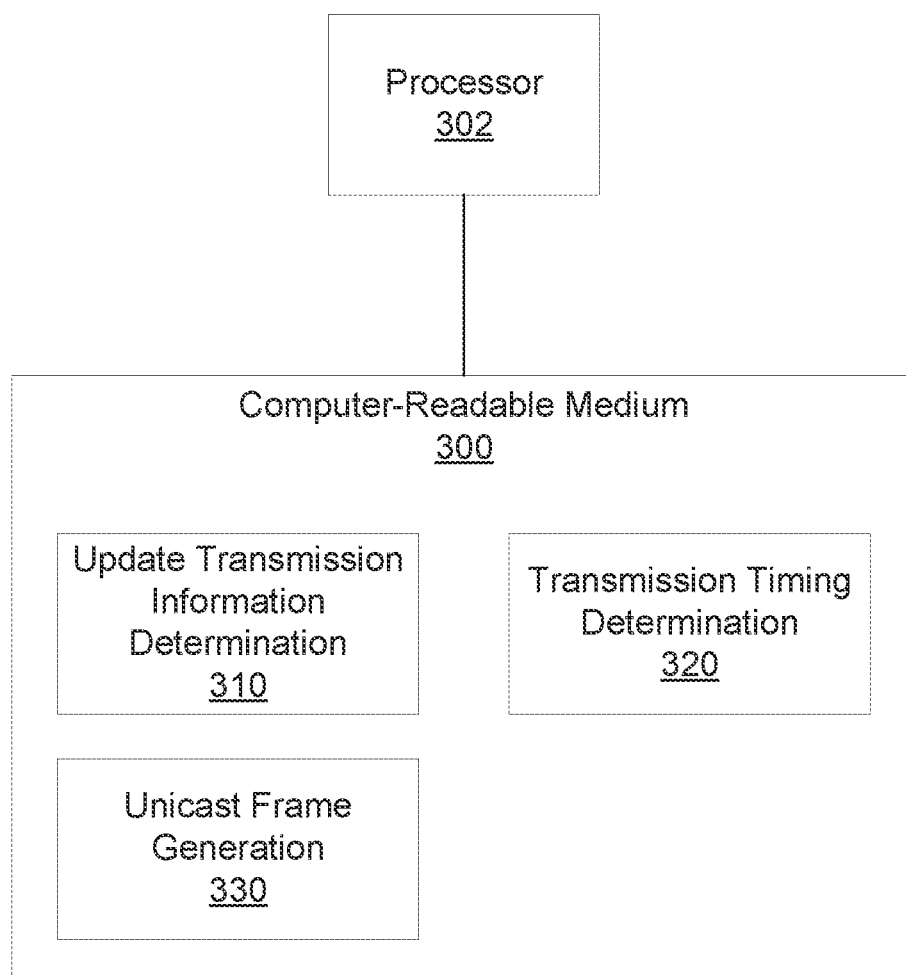
FIG. 3 is a block diagram of an example of a computer-readable medium containing instructions that, when executed by a processor, cause the processor to generate updated transmission information.

FIG. 3 is a block diagram of an example of a computer-readable medium 300 containing instructions that, when executed by a processor 302, cause the processor 302 to generate updated transmission information. The computer-readable medium 300 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 302 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 300 may include an update transmission information determination module 310. As used herein, a module (in some examples referred to as a software module) is a set of instructions that when executed or interpreted by a processor or stored at a processor-readable medium realizes a component or performs a method. The update transmission information determination module 310 may cause the processor 302 to determine that a unicast rate selection device (not shown) is to receive updated transmission information for a client device in a multicast group. For example, the update transmission information determination module 310 may cause the processor 302 to determine that transmission information for the client device is about to age out of the unicast rate selection device or has already done so. The update transmission information determination module 310 may cause the processor 302 to determine that a unicast frame should be transmitted to the client device to generate the updated transmission information for the unicast rate selection device.

A transmission timing determination module 320 may cause the processor 302 to determine when to transmit a unicast transmission to the client device to generate the updated transmission information. The transmission timing determination module 320 may cause the processor 302 to determine the unicast transmission should be transmitted immediately, determine the unicast transmission should be transmitted when a next multicast packet is received, determine the timing based on queue occupancy, based on a sleep state of the client device, or the like. The transmission timing determination module 320 may cause the processor 302 to determine when to transmit the unicast transmission by causing the processor 302 to determine when to insert a unicast frame into a transmit queue.

A unicast frame generation module 330 may cause the processor 302 to generate a unicast frame for transmission to the client device. The unicast frame generation module 330 may cause the processor 302 to generate the unicast frame when the unicast transmission should be transmitted to the client device. Alternatively, the unicast frame generation module 330 may cause the processor 302 to generate the unicast frame when the update transmission information determination module 310 determines that updated transmission information is needed and transmission may be delayed until the appropriate time. The unicast frame generation module 330 may cause the processor 302 to generate a dummy unicast frame, may generate the frame by converting a multicast frame to a unicast frame, or the like.

The unicast frame generation module 330 may cause the processor 302 to insert the generated unicast frame into a transmit queue for transmission to the client device. The transmission information may be updated based on whether the client device responds with an ACK. The unicast rate selection device may determine whether an ACK was received without the computer-readable medium 300 causing the processor 302 to determine whether an ACK was received. Referring to FIG. 2, the update transmission information determination module 310, the transmission timing determination module 320, or the unicast frame generation module 330, when executed by the processor 302, may realize a unicast generation component 221.

Figure 4:
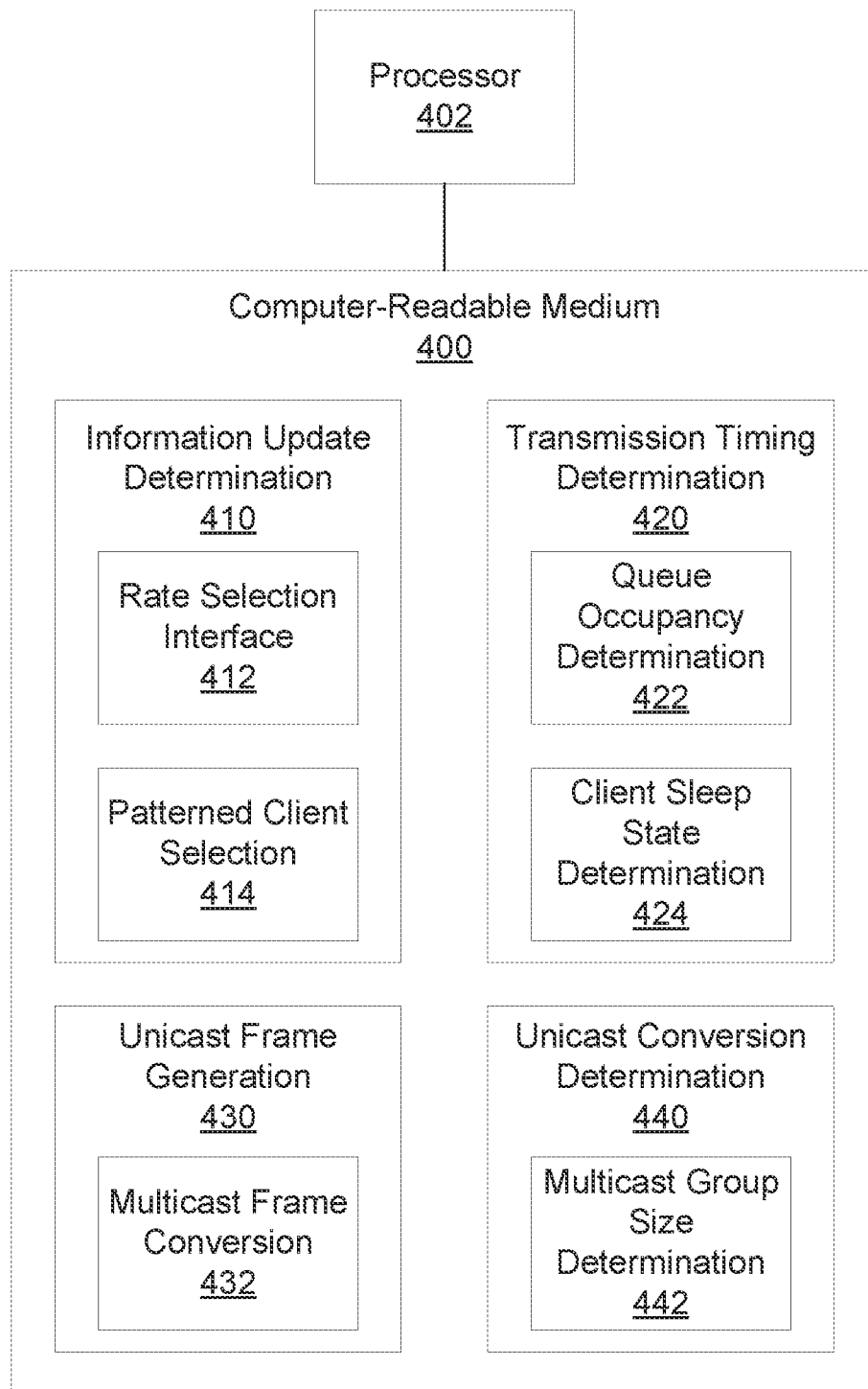
FIG. 4 is a block diagram of another example of a computer-readable medium containing instructions that, when executed by a processor, cause the processor to generate updated transmission information.

FIG. 4 is a block diagram of another example of a computer-readable medium 400 containing instructions that, when executed by a processor 402, cause the processor 402 to generate updated transmission information. The computer-readable medium 400 may include an information update determination module 410 that causes a processor 402 to determine that a unicast rate selection device (not shown) is to receive updated transmission information for a client device in multicast group. The information update determination module 410 may include a rate selection interface module 412. The rate selection interface module 412 may cause the processor 402 to receive an indication that the client device is to receive a unicast transmission (i.e., an indication the unicast rate selection device is to receive updated transmission information for the client device). For example, a unicast or multicast rate selection device may provide the indication that the client device is to receive the unicast transmission (e.g., transmit the indication to the rate selection interface module 412, store the indication in a persistent or non-persistent storage location accessible by the rate selection interface module 412, etc.).

In the illustrated example, the information update determination module 410 also includes a patterned client selection module 414. In other examples, the information update determination module may include one of the rate selection interface module 412 and the patterned client selection module 414. The patterned client selection module 414 may select a client device to receive a unicast transmission based on a predetermined pattern for selecting client devices (i.e., a client device for which the rate selection device is to receive updated transmission information). The predetermined pattern may include a round robin scheme for transmitting unicast transmissions, a pattern selected based on a unicast data rate for each client device, or the like.

The computer-readable medium 400 may include a transmission timing determination module 420 that causes a processor 402 to determine when to transmit a unicast transmission to the client device. The transmission timing determination module 420 may include a queue occupancy determination module 422 that causes the processor 402 to determine whether an occupancy of a transmit queue for multicast frames is above a predetermined threshold. When the occupancy is above the predetermined threshold, the transmission timing determination module 420 may delay the unicast transmission. The queue occupancy determination module 422 may cause the processor 402 to detect when the queue occupancy has dropped below the predetermined threshold. When the occupancy drops below the predetermined threshold, the transmission timing determination module 420 may cause the processor 402 to determine that the unicast transmission should be transmitted to the client device.

The transmission timing determination module 420 may include a client sleep state determination module 424. The client sleep state determination module 424 may cause the processor 402 to determine whether the client device is sleeping. The client sleep state determination module 424 may also cause the processor 402 to determine when the client device will wake up. The transmission timing determination module 420 may cause the processor 402 to determine when the unicast transmission should be transmitted based on when the client device will wake up. Before the client device wakes up, the information update determination module 410 may cause the processor 402 to determine that the client device is to receive additional unicast transmissions to generate the updated transmission information for the client device (e.g., additional unicast transmissions at various data rates). The transmission timing determination module 420 may cause the processor 402 to determine that the unicast transmissions should be transmitted in bulk when the client device wakes up.

The computer-readable medium 400 may include a unicast frame generation module 430 that causes the processor 402 to generate a unicast frame for transmission to the client device. The unicast frame generation module 430 may include a multicast frame conversion module 432 that causes the processor 402 to convert multicast frames to unicast frames for transmission to the client device. For example, if the transmission timing determination module 420 causes the processor 402 to determine that a plurality of unicast transmissions should be transmitted in bulk when the client device wakes up, the multicast frame conversion module 432 may cause the processor 402 to convert the plurality of multicast frames to unicast frames for transmission to the client device when the client device wakes up. The multicast frame conversion module 432 may convert a multicast frame by generating a unicast frame containing a payload from the multicast frame. The original multicast frame may still be transmitted after conversion, or the multicast frame may be discarded.

The unicast frame generation module 430 may cause the processor 402 to set a quality of service parameter for the unicast frame. The unicast frame generation module 430 may cause the processor 402 to set the quality of service parameter to a value that limits the number of retransmissions attempted so as to reduce the channel capacity utilized by generated unicast frames. For example, the unicast frame generation module 430 may cause the processor 402 to set the quality of service parameter to a quality of service value for video rather than a best effort quality of service. In one example, the unicast frame generation module 430 may cause the processor 402 to set an internet protocol type of service (TOS) field to a value corresponding to a video quality of service.

The computer-readable medium 400 may include a unicast conversion determination module 440. The unicast conversion determination module 440 may cause the processor 402 to determine whether all multicast frames should be converted to unicast frames for every client device in the multicast group. For example, a video application may require a low packet drop ratio, such as less than one percent. Unicast transmission, which allows for retransmission of unacknowledged frames, is preferable for such an application when there is sufficient channel capacity. The unicast conversion determination module 440 may cause the processor 402 to determine whether to convert the multicast frames to unicast frames based on predetermined criteria. The predetermined criteria may include a size of the multicast group (i.e., a number of client devices receiving multicast frames), a data rate for each client device in the multicast group, an amount of the channel capacity that would be occupied if conversion to unicast frames was performed, or the like.

In the illustrated example, the unicast conversion determination module 440 includes a multicast group size determination module 442. The multicast group size determination module 442 may cause the processor 402 to determine whether a size of the multicast group has dropped below a predetermined threshold. If so, the unicast frame generation module 430 and multicast frame conversion module 432 may cause the processor 402 to convert each multicast frame to unicast frames for each client device. The original multicast frames may be discarded without transmission after conversion. Referring to FIG. 2, the information update determination module 410, the transmission timing determination module 420, the unicast frame generation module 430, or the unicast conversion determination module 440, when executed by the processor 402, may realize a unicast generation component 221.

Figure 5:
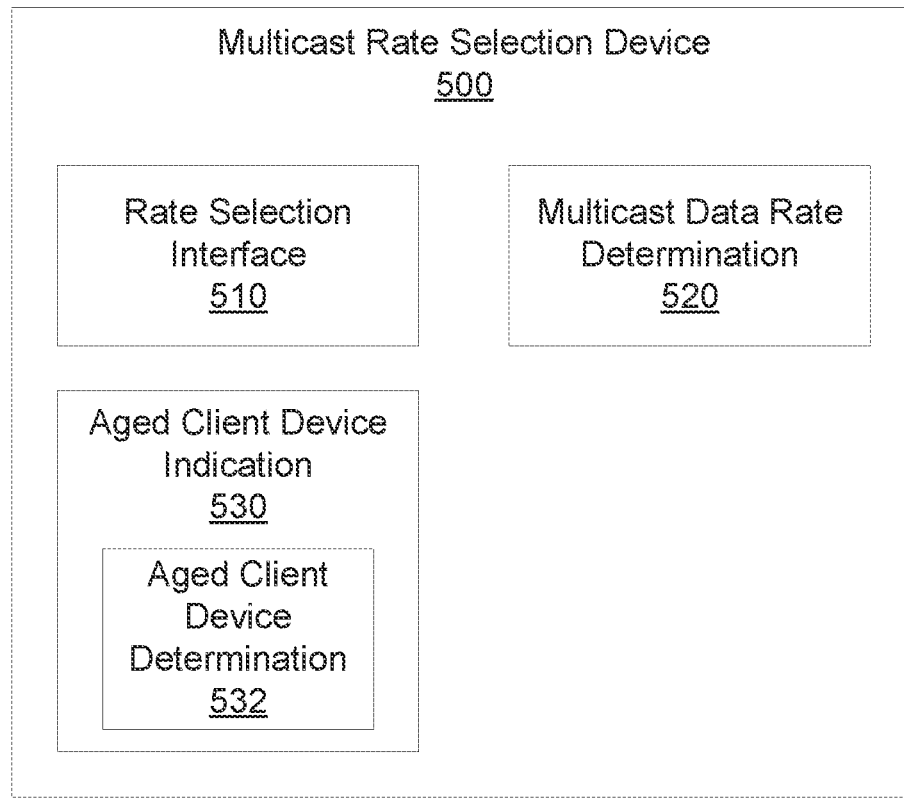
FIG. 5 is a block diagram of an example of a multicast rate selection device to determine a multicast data rate.

FIG. 5 is a block diagram of an example of a multicast rate selection device 500 to determine a multicast data rate. The multicast rate selection device 500 may include a rate selection interface component 510. The rate selection interface component 510 may receive an indication of a unicast data rate for each of a plurality of client device from a unicast rate selection device (not shown). The unicast rate selection device may determine a unicast data rate for each client device based on transmissions to that client device. The rate selection interface component 510 may receive the indications of the unicast data rates by requesting the indications of the unicast data rates, by reading them from a storage device, by periodically receiving unsolicited indications of the unicast data rates, or the like.

The multicast rate selection device 500 may include a multicast data rate determination component 520. The multicast data rate determination component 520 may determine a multicast data rate at which multicast frames will be transmitted. The multicast data rate determination component 520 may determine the multicast data rate based on predetermined criteria. For example, the multicast data rate determination component 520 may determine the multicast data rate based on the unicast data rates for the plurality of client devices (e.g., a minimum, maximum, mean, median, mode, etc. data rate of the plurality of client devices, of a subset of the plurality of client devices, or the like.)

The multicast rate selection device 500 may include an aged client device indication component 530. The aged client device indication component 530 may include an aged client device determination component 532. The aged client device determination component 532 may determine whether transmission information for any of the client devices should be updated in the unicast rate selection device. For example, the aged client device determination component 532 may determine whether a predetermined time has passed since a last unicast transmission was sent to one of the plurality of client devices.

If the aged client device determination component 532 determines that transmission information for one of the plurality of client devices should be updated (e.g., that the predetermined time has passed), the aged client device indication component 530 may set an indication that the one of the plurality of client devices is to receive a unicast frame. The aged client device indication component 530 may set the indication by saving the indication to persistent or non-persistent storage (e.g., adjusting a state variable in a data structure for the client device), transmitting the indication, or the like. For example, the aged client device indication component 530 may transmit the indication to a unicast generation device (e.g., a device that includes the unicast generation component 221), store the indication in a location accessible by the unicast generation device (e.g., a data structure accessible by the unicast generation device), or the like. Referring to FIG. 2, the rate selection interface component 510, the multicast data rate determination component 520, or the aged client device indication component 530 may realize a multicast rate selection component 222.

Figure 6:
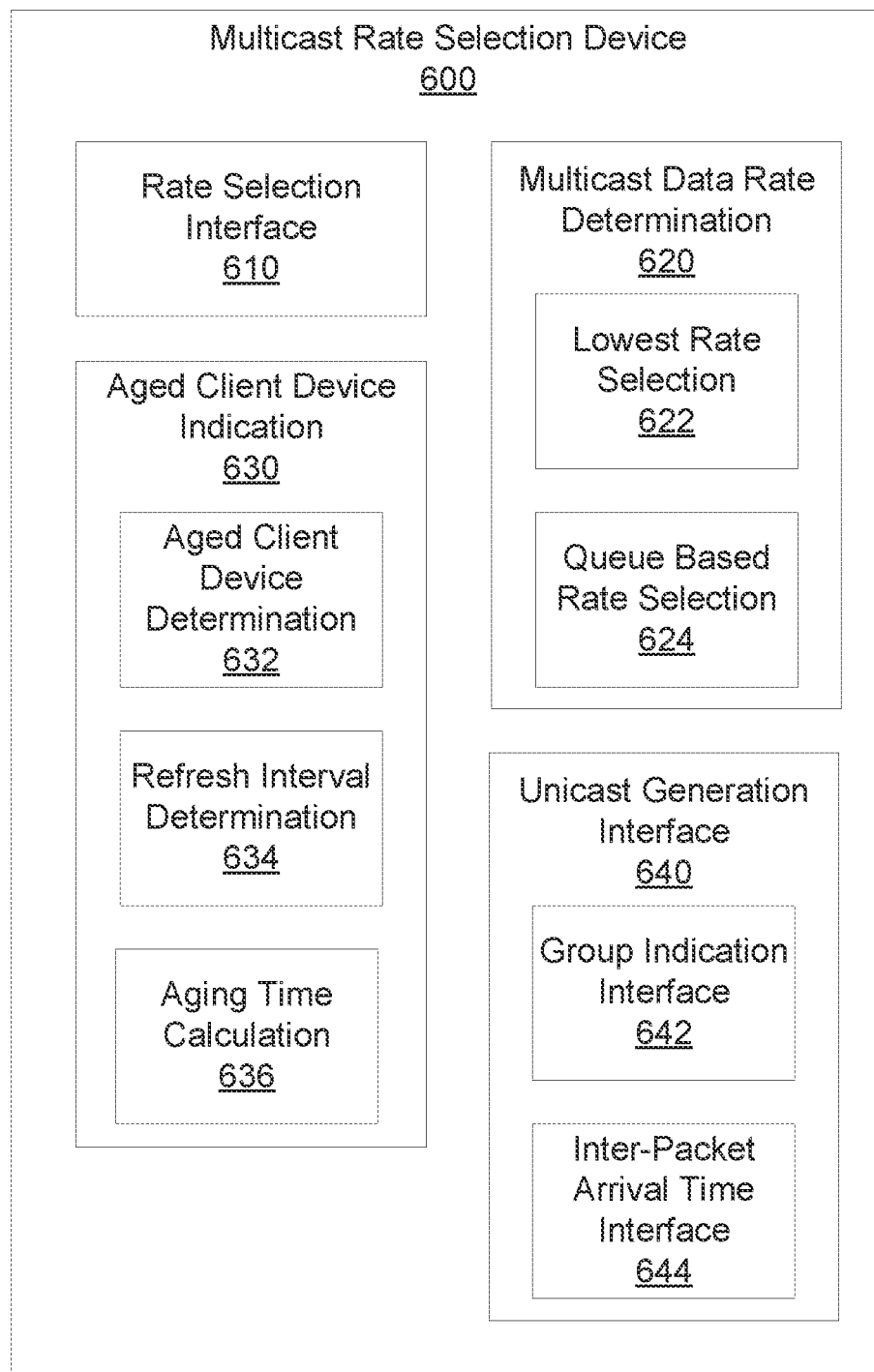
FIG. 6 is a block diagram of another example of a multicast rate selection device to determine a multicast data rate.

FIG. 6 is a block diagram of another example of a multicast rate selection device 600 to determine a multicast data rate. The multicast rate selection device 600 may include a rate selection interface component 610 to receive an indication of a data rate for each of a plurality of client devices. The multicast rate selection device 600 may include a unicast generation interface component 640 to communicate with a unicast generation device. The multicast rate selection device 600 may also include a multicast data rate determination component 620 to determine a multicast data rate.

The unicast generation interface component 640 may include a group indication interface 642 to receive an indication of client devices that belong to a multicast group. The plurality of client device for which indications of data rates were received may include some or all of the client devices that belong to the multicast group. The multicast data rate determination component 620 may include a lowest rate selection component 622. The lowest rate selection component 622 may determine the lowest data rate among the indicated data rates of the client devices that belong the multicast group. The multicast data rate determination component 620 may determine the multicast data rate by setting the multicast data rate as the lowest data rate.

The unicast generation interface component 640 may include an inter-packet arrival time (IAT) interface component 644 to receive an indication of an average IAT for packets containing data for the multicast group. For example, the unicast generation device may determine the average IAT by measuring and averaging the time between arrivals of multicast packets. The IAT interface component 644 may receive the average IAT from the unicast generation device. The multicast data rate determination component 620 may include a queue based rate selection component 624 to calculate, based on the average IAT, a lowest data rate that prevents multicast frames from being dropped from a transmit queue. The multicast data rate determination component 620 may determine how quickly the transmit queue will fill based on the average IAT. The multicast data rate determination component 620 may determine the multicast data rate by setting the multicast data rate at least as high as the lowest data rate that prevents multicast frames from being dropped from the transmit queue. In one example, the multicast data rate determination component 620 may set the multicast data rate as the greater of the lowest data rate among the client devices in the multicast group and the lowest data rate that prevents multicast frames from being dropped from the transmit queue.

The multicast rate selection device 600 may include an aged client device indication component 630. The aged client device indication component 630 may include an aged client device determination component 632 to determine that a predetermined time has passed since a last unicast transmission was sent to one of the plurality of client devices. The aged client device indication component 630 may set an indication that the one of the plurality of client devices is to receive a unicast frame.

The aged client device indication component 630 may include a refresh interval determination component 634 to determine a refresh interval after which a client device will have its unicast data rate gradually degraded by a unicast rate selection device if no updated transmission information has been received in the meantime (i.e., if no unicast frames have been sent in the meantime). The refresh interval determination component 634 may determine the refresh interval by receiving an indication of the refresh interval from the unicast rate selection device, by reading a stored indication of the refresh interval, or the like.

The aged client device indication component 630 may include an aging time calculation component 636 to calculate the predetermined time used to determine if updated transmission information is needed for any of the client devices. In one example, the aging time calculation component 636 may calculate the predetermined time based on the difference between the refresh interval and the average IAT (e.g., the predetermined time may equal the difference between the refresh interval and the average IAT, may equal the difference between the refresh interval and the average IAT plus or minus an offset, etc.). By including the average IAT in the calculation, there may be sufficient time to wait for a multicast frame to arrive so that it can be converted to a unicast frame without the data rate of a client device being degraded during the wait. Referring to FIG. 2, the rate selection interface component 610, the multicast data rate determination component 620, the aged client device indication component 630, or the unicast generation interface component 640 may realize a multicast rate selection component 222.

Figure 7:
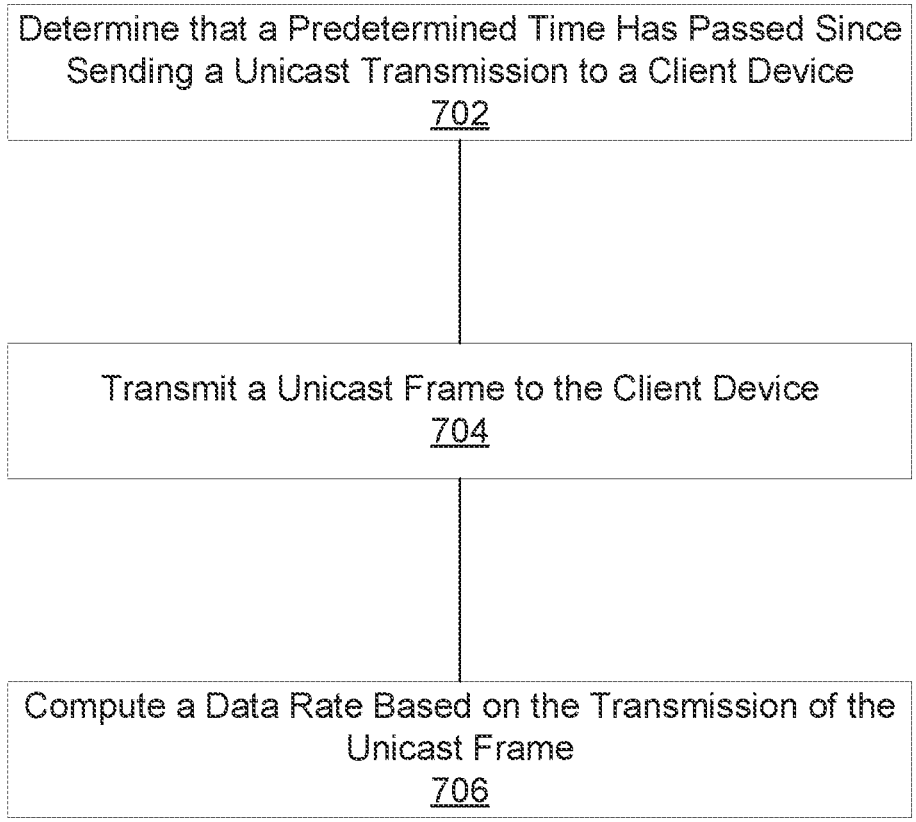
FIG. 7 is a flow diagram of an example of a method to determine a data rate for a client device in a multicast group.

FIG. 7 is a flow diagram of an example of a method 700 to determine a data rate for a client device in a multicast group. At block 702, the method 700 may include determining that a predetermined time has passed since sending a unicast transmission to a client device. For example, an indication of when a most recent unicast transmission was sent may be determined by a unicast rate selection component. The time since the most recent unicast transmission may be compared to the current time to determine if the predetermined time has passed. In an example implementation, the multicast rate selection component 222 of FIG. 2 may determine that the predetermined time has passed.

At block 704, the method 700 may include transmitting a unicast frame to the client device. Transmitting the unicast frame to the client device may include generating the unicast frame. Generating the unicast frame may include creating a dummy unicast frame, converting a multicast frame to a unicast frame, or the like. The generated unicast frame may be transmitted to the client device, and the multicast frame may be transmitted to the multicast group. For example, referring to FIG. 2, the unicast generation component 221 may instruct the transceiver 210 to transmit the unicast frame to the client device.

At block 706, the method 700 may include computing a data rate based on the transmission of the unicast frame. If the transmitted unicast frame was successfully received by the client device, the client device may transmit an ACK. Transmission information for the client device may be updated based on whether the ACK was received and the data rate of the unicast frame that was transmitted. A rate selection calculation may be used to compute the data rate based on the PER at a plurality of data rates. For example, the unicast rate selection component 223 of FIG. 2 may compute the data rate.

Figure 8:
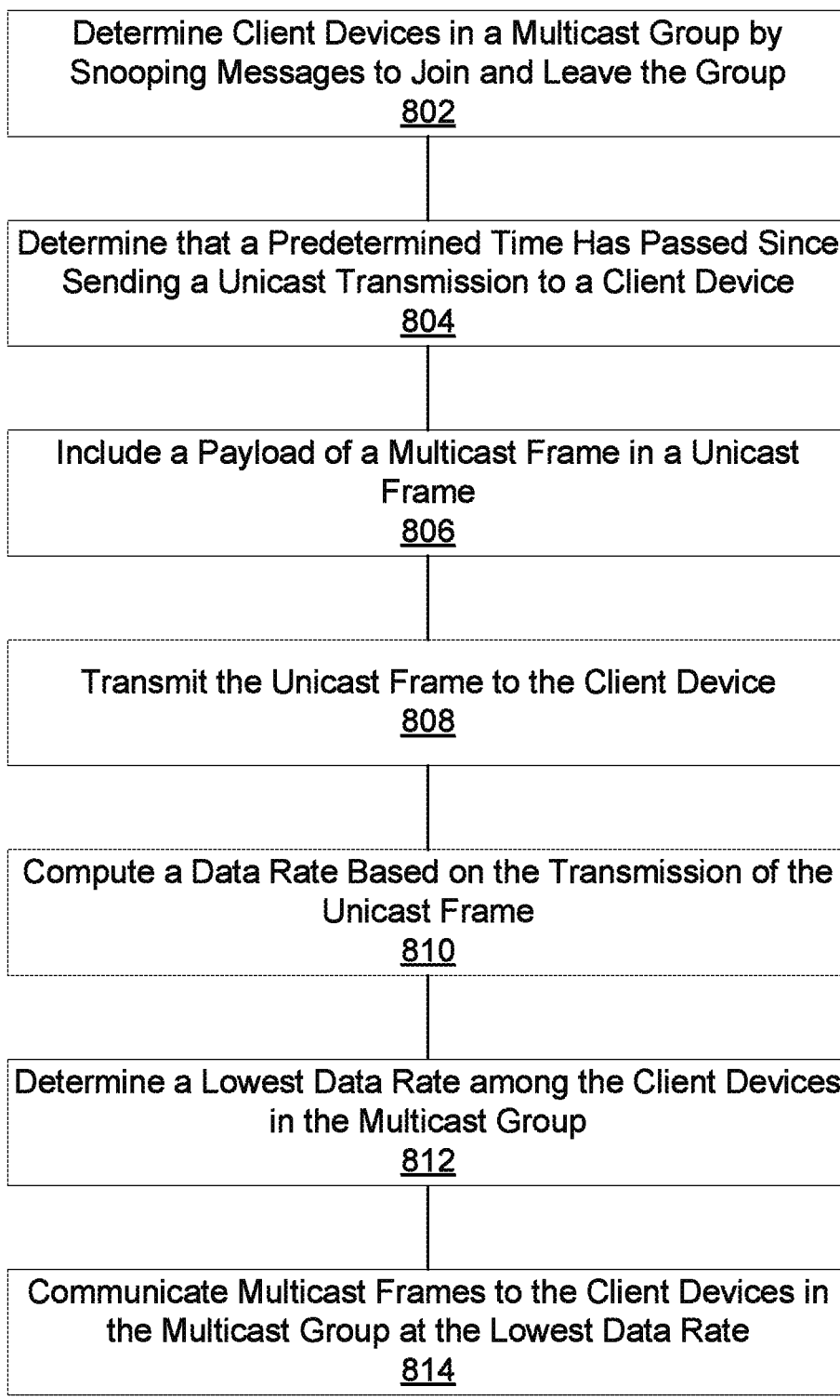
FIG. 8 is a flow diagram of another example of a method to determine a multicast data rate for client devices in a multicast group.

FIG. 8 is a flow diagram of another example of a method 800 to determine a multicast data rate for client devices in a multicast group. The method 800 may include a block 802 to determine client devices in a multicast group by snooping messages to join and leave the group. The client devices may send messages to join or leave the multicast group to a source of the multicast data. For example, the client devices may send Internet Group Management Protocol (IGMP) messages to join or leave the multicast group. The messages may be monitored to determine which client devices are in the multicast group. In an example implementation, the unicast generation component 221 of FIG. 2 may determine which client devices are in the multicast group.

At block 804, the method 800 may include determining that a predetermined time has passed since sending a unicast transmission to a client device. For example, the multicast rate selection component 222 may determine the predetermined time has passed. At block 806, the method 800 may include generating a unicast frame by including a payload of a multicast frame in a unicast frame. A unicast frame header specifying the client device as a destination may be combined with the payload (e.g., higher layer signaling or data) from the multicast frame to generate the unicast frame. At block 808, the method 800 may include transmitting the unicast frame to the client device. In an example implementation, the unicast generation component 221 of FIG. 2 may include the payload of the multicast frame in the unicast frame and may instruct the transceiver 210 to transmit the unicast frame to the client device.

At block 810, the method 800 may include computing a data rate based on the transmission of the unicast frame. For example, the data rate may be determined based on whether the transmission was successful. Referring to FIG. 2, the unicast rate selection component 223 may compute the data rate. At block 812, the method 800 may include determining a lowest data rate among computed data rates for client devices in the multicast group. The data rates of the client devices in the multicast group may be compared to one another to determine which is the lowest. At block 814, the method 800 may include communicating multicast frames to the client devices in the multicast group at the lowest data rate. In the illustrated example, the multicast frames are communicated at the lowest data rate. In other examples, there may be a minimum data rate required to communicate the multicast data, and the multicast frames may be communicated at the greater of the minimum data rate required to communicate the multicast data and the lowest data rate among data rates of client devices in the multicast group. In an example implementation, the multicast rate selection component 222 of FIG. 2 may determine the lowest rate and may instruct the transceiver 210 to communicate the multicast frames at the lowest data rate.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system, comprising:
a transceiver to communicate multicast frames to client devices in a multicast group; and
a controller configured to:
determine that a predetermined time has passed since the transceiver most recently sent a unicast transmission to one of the client devices;
determine an expected multicast traffic;
generate a dummy unicast frame having a payload that mimics the expected multicast traffic;
instruct the transceiver to transmit the dummy unicast frame to each of the client devices;
compute a unicast data rate for each of the client devices based on the transmission of the dummy unicast frame to each of the client devices; and
determine a multicast data rate by selecting a median unicast data rate of a subset of the computed unicast data rates;
the transceiver communicating multicast frames to the client devices in accordance with the determined multicast rate.

2. The system of claim 1, wherein the controller is to:
determine a lowest data rate for the client devices; and
instruct the transceiver to communicate the multicast frames to the client devices at the determined lowest data rate.

3. The system of claim 1, wherein the controller is to determine the client devices in the multicast group by snooping messages to join and leave the multicast group.

4. The system of claim 1, wherein the controller is to include a payload of a multicast frame in the dummy unicast frame.

5. The system of claim 4, wherein the controller is to instruct the transceiver to transmit the multicast frame to the multicast group.

6. A method, comprising:
determining, by a processor, that a predetermined time has passed since a transceiver most recently sent a unicast transmission to a client device in a multicast group;
determining, by the processor, an expected multicast traffic;
generating, by the processor, a dummy unicast frame having a payload that mimics the expected multicast traffic;
instructing, by the processor, the transceiver to transmit the dummy unicast frame to each of the client devices;
computing, by the processor, a unicast data rate for each of the client devices based on the transmission of the dummy unicast frame to each of the client devices; and
determining a multicast data rate by selecting a median unicast data rate of a subset of the computed unicast data rates,
the transceiver communicating multicast frames to the client devices in accordance with the determined multicast rate.

7. The method of claim 6, further comprising:
determining a lowest data rate for the plurality of client devices; and
instructing the transceiver to communicate the multicast frames to the plurality of client devices at the determined lowest data rate.

8. The method of claim 6, wherein the multicast group is determined by snooping messages to join and leave the multicast group.

9. The method of claim 6, wherein the unicast frame includes a payload of a multicast frame.

10. The method of claim 9, wherein the transceiver is instructed to transmit the multicast frame to the multicast group.

11. A system, comprising:
a transceiver to communicate multicast frames to client devices in a multicast group; and
a controller configured to:
determine that a predetermined time has passed since the transceiver most recently sent a unicast transmission to one of the client devices;
determine whether to convert multicast frames to unicast frames based on a size of the multicast group, a data rate of the client devices, and an amount of channel capacity occupied if the multicast frames were converted to the unicast frames;

based on the determination of whether to convert the multicast frames:

set a quality of service parameter to limit a number of transmissions for a unicast frame;

instruct the transceiver to transmit the unicast frame to each of the client devices;

update a unicast data rate for each of the plurality of client devices based on the transmission of the unicast frame to each of the client devices; and determine a multicast data rate by selecting a median unicast data rate of a subset of the computed unicast data rates, the transceiver communicating multicast frames to the client devices in accordance with the determined multicast rate.

12. The system of claim 11, wherein the controller is to determine the plurality of client devices in the multicast group by snooping messages to join and leave the multicast group.

13. The system of claim 11, wherein the controller is to include a payload of a multicast frame in the unicast frame.

14. The system of claim 11, wherein the quality of service parameter comprises an internet protocol type of service field.

15. The system of claim 11, wherein the size of the multicast group comprises a number of client devices receiving multicast frames.

16. The system of claim 11, wherein the controller is further configured to convert each multicast frame to unicast frames and discard the multicast frames.

17. The system of claim 11, wherein the controller is further configured to receive an indication that the one of the client devices is to receive a unicast transmission.

18. The system of claim 11, wherein the controller is further configured to select a client device to receive a unicast transmission.

19. The system of claim 18, wherein the selected client device is based on a pattern for selecting client devices.

20. The system of claim 11, wherein the controller is further configured to delay transmitting the unicast frame based on the amount of channel capacity.

* * * * *